(12) United States Patent
Dudar (10) Patent No.: US 10,385,815 B1
(45) Date of Patent: Aug. 20, 2019

(54) METHODS AND SYSTEM FOR OPERATING AN ENGINE

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/912,380

(22) Filed: Mar. 5, 2018

(51) Int. Cl.
| | |
|---|---|
| *F02N 11/08* | (2006.01) |
| *B60W 20/40* | (2016.01) |
| *B60L 11/18* | (2006.01) |
| *B60W 10/26* | (2006.01) |
| *B60W 30/18* | (2012.01) |
| *B60W 10/06* | (2006.01) |

(52) U.S. Cl.
CPC ...... *F02N 11/0825* (2013.01); *B60L 11/1862* (2013.01); *B60W 10/06* (2013.01); *B60W 10/26* (2013.01); *B60W 20/40* (2013.01); *B60W 30/18018* (2013.01); *B60W 2510/244* (2013.01); *F02N 2200/061* (2013.01); *F02N 2200/101* (2013.01); *F02N 2200/102* (2013.01)

(58) Field of Classification Search
CPC ............... F02N 11/08; F02N 11/0825; F02N 2200/061; F02N 2200/102; B60W 10/06; B60W 10/26; B60W 20/40; B60W 30/18018; B60W 2510/244; B60L 11/1862
See application file for complete search history.

(56) References Cited

U.S. PATENT DOCUMENTS

| | | | |
|---|---|---|---|
| 4,520,271 A | | 5/1985 | Goertler et al. |
| 5,003,948 A | * | 4/1991 | Churchill ............... F02D 11/10 123/352 |
| 6,679,214 B2 | | 1/2004 | Kobayashi et al. |
| 7,124,691 B2 | * | 10/2006 | Donnelly .............. B60L 3/0046 105/26.05 |
| 7,797,099 B2 | | 9/2010 | Terada |
| 8,511,270 B2 | | 8/2013 | Hamane |
| 8,935,075 B2 | | 1/2015 | Otanez et al. |
| 9,121,356 B2 | | 9/2015 | Boesch et al. |
| 2013/0245925 A1 | | 9/2013 | Malone et al. |
| 2015/0142265 A1 | | 5/2015 | Killy et al. |
| 2016/0178700 A1 | | 6/2016 | Kawazu et al. |

FOREIGN PATENT DOCUMENTS

EP    1266800 A2    12/2002

\* cited by examiner

*Primary Examiner* — Hieu T Vo
(74) *Attorney, Agent, or Firm* — Julia Voutyras; McCoy Russell LLP (57) ABSTRACT

Systems and methods for operating a vehicle that includes an engine that may be automatically stopped and started are described. In one example, automatic stopping of the engine may be inhibited if voltage of a battery is reduced by more than a threshold voltage while an engine of the vehicle is operated in a deceleration fuel shut off mode.

20 Claims, 4 Drawing Sheets

METHODS AND SYSTEM FOR OPERATING AN ENGINE

FIELD

The present description relates to methods and a system for operating an engine that may be automatically stopped and started to conserve fuel. The methods and systems may be particularly useful to inhibit automatic engine stopping and starting during conditions of battery degradation.

BACKGROUND AND SUMMARY

A vehicle may include an engine that may be automatically stopped and started to conserve fuel. The engine may be stopped via a controller in response to vehicle operating conditions without receiving a specific request to stop the engine from a human driver or occupant of the vehicle. For example, the engine may be automatically stopped in response to driver demand torque being less than a threshold torque and a human driver applying a brake pedal. The engine may be automatically restarted after it has been automatically stopped in response to a driver demand torque that is greater than a threshold torque. However, if an attempt is made to automatically restart the engine with a battery that is degraded or partially degraded, the engine may fail to restart. The vehicle's human driver may attempt to manually restart the engine, but the manual attempts to restart the engine are also likely to be futile because of the degraded state of the battery. The vehicle's human driver may also succeed in restarting the engine by jump starting the engine using a second battery. Nevertheless, if the engine is subsequently automatically stopped, the engine may once again fail to restart due to battery degradation.

The inventor herein has recognized the above-mentioned issues and has developed a powertrain operating method, comprising: increasing loads of vehicle electrical accessories via a controller during deceleration fuel shut off in response to an indication that the battery has been replaced or boosted; and inhibiting automatic engine stopping via the controller in response to the voltage of the battery decreasing more than the threshold amount.

By applying an electrical load to a battery during deceleration fuel shut off of an engine, it may be possible to assess the presence or absence of battery degradation so that automatic engine stopping may be allowed or prohibited. In one example, output of an alternator is reduced to zero while one or more electrical loads are applied to the battery while the engine is rotating and not combusting fuel. Operation of the engine in this way prevents engine misfires while allowing the battery to be drained of charge so that battery health may be evaluated without interference from electrical output of the alternator. In addition, since the engine is already rotating, the engine does not have to be rotated via an electric machine to restart the engine.

The present description may provide several advantages. In particular, the approach may allow for diagnosing a battery in a way that reduces the possibility of engine no start conditions. Further, the approach allows or prevents automatic engine stopping based on state of the battery so as to reduce the possibility of engine no starts. Further still, the approach diagnoses a battery in a way that allows an engine to operate without misfires.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
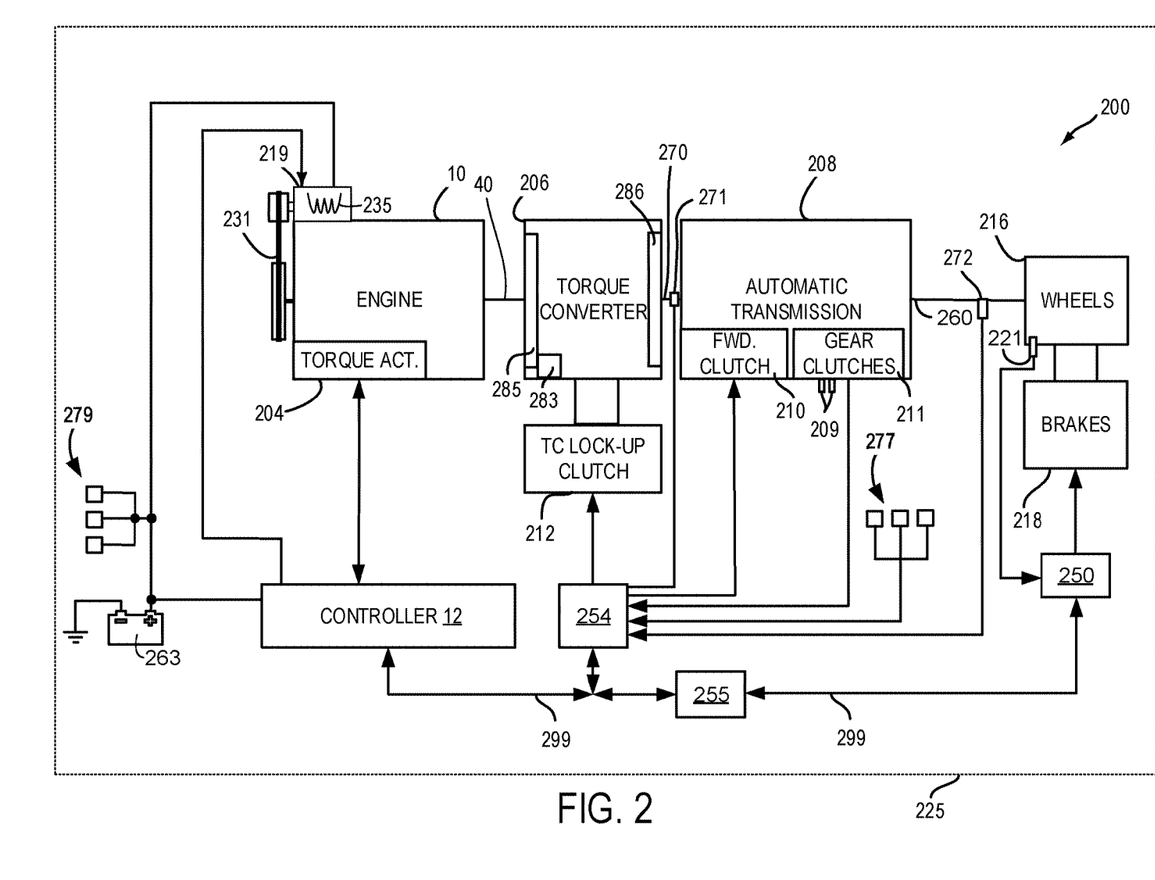
FIG. 2 is a schematic diagram of a vehicle driveline.
Figure 3:
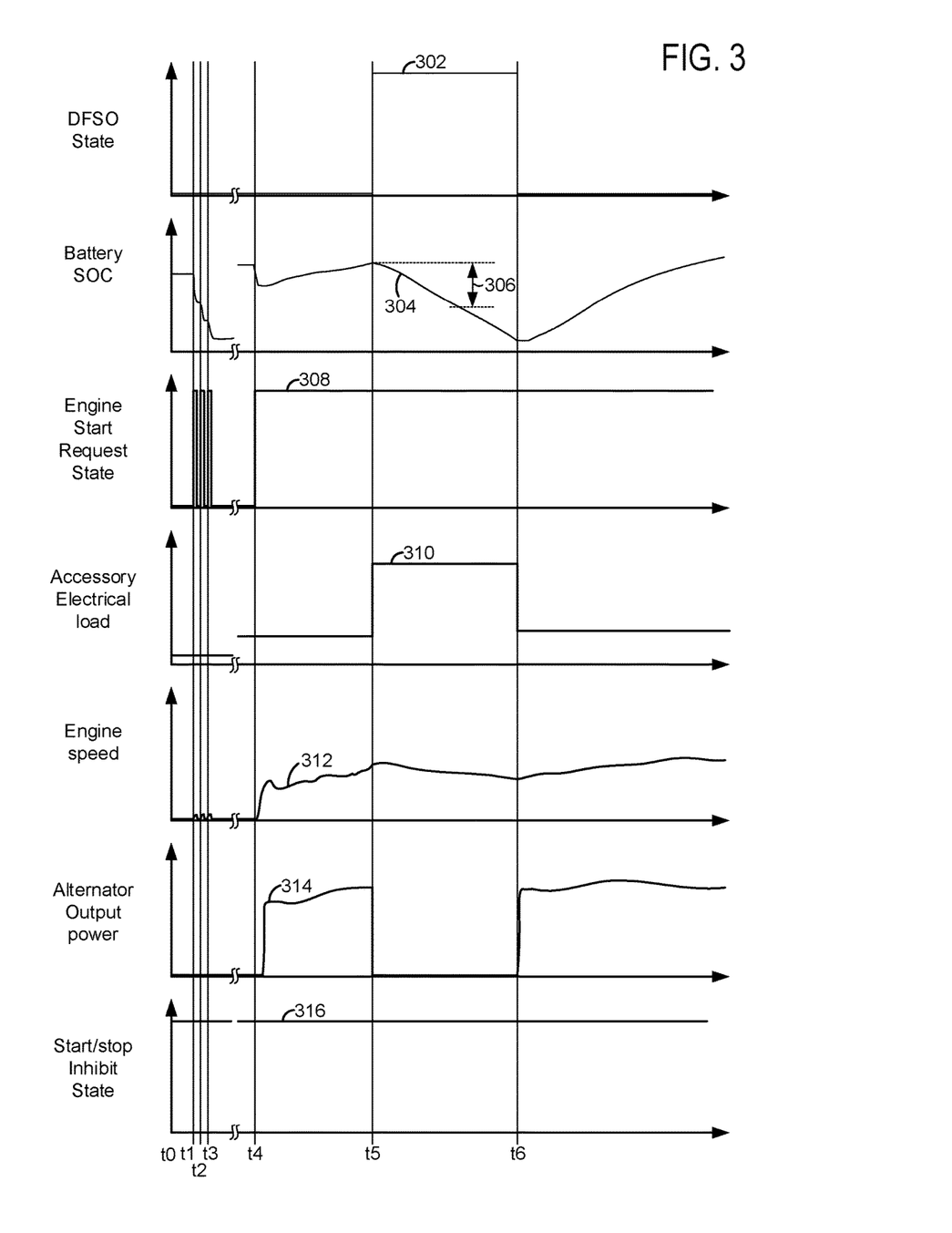
FIG. 3 shows an example engine operating sequence.
Figure 4:
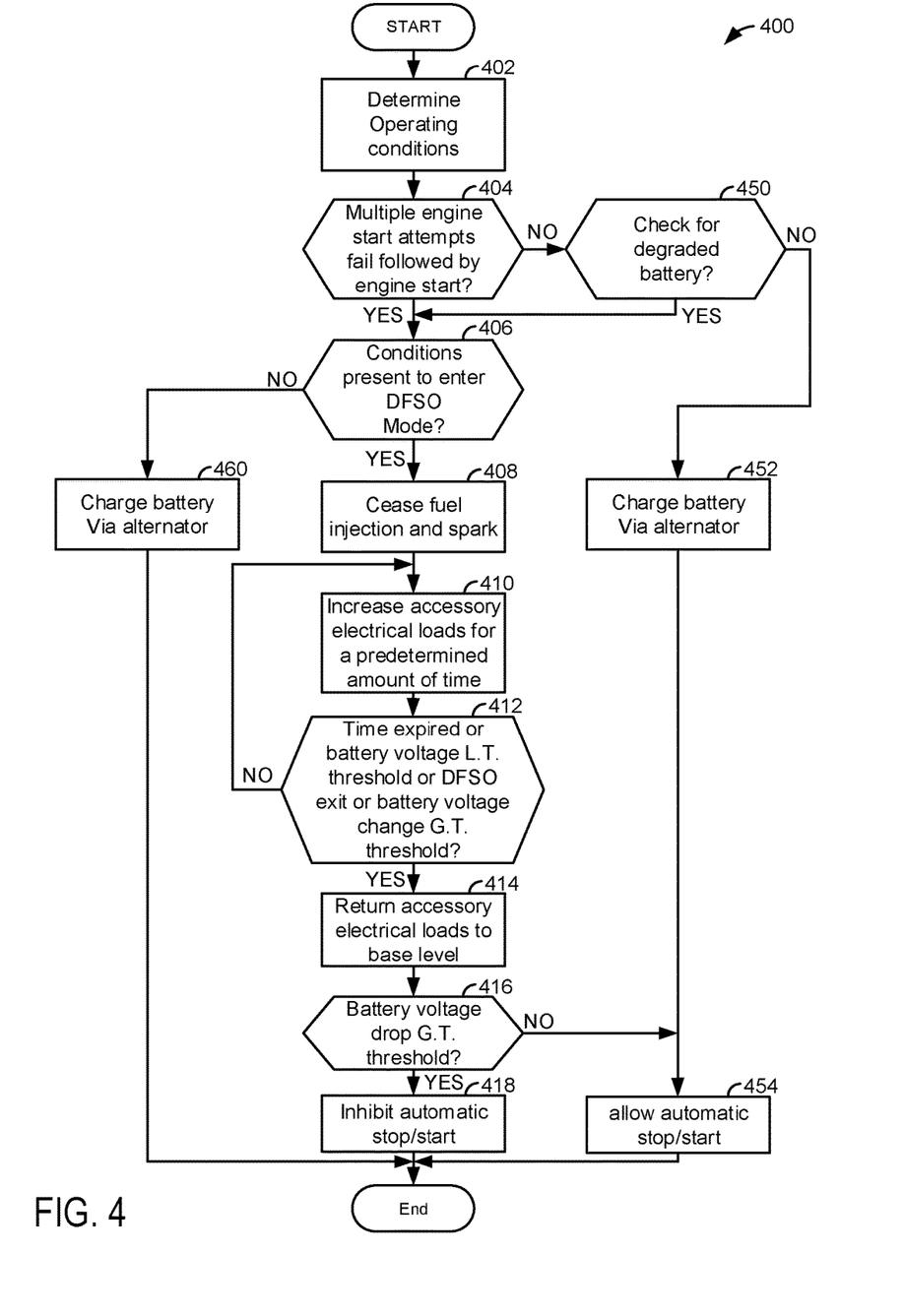
FIG. 4 shows a method for operating an engine and diagnosing an electric energy storage device.

The present description is related to operating an engine and diagnosing operation of a battery in a way that reduces the possibility of engine no starts. The method may be particularly beneficial for stop/start engines that are automatically stopped and started in response to vehicle operating conditions other than an input that may be exercised by a driver of a vehicle that has a sole function of requesting engine stopping and starting. The engine may be of the type shown in FIG. 1. The engine and a battery may be included in a driveline of a vehicle as is shown in FIG. 2. The battery may be diagnosed as is shown in the sequence of FIG. 3. A method for operating an engine and diagnosing a battery is shown in FIG. 4.

Figure 1:
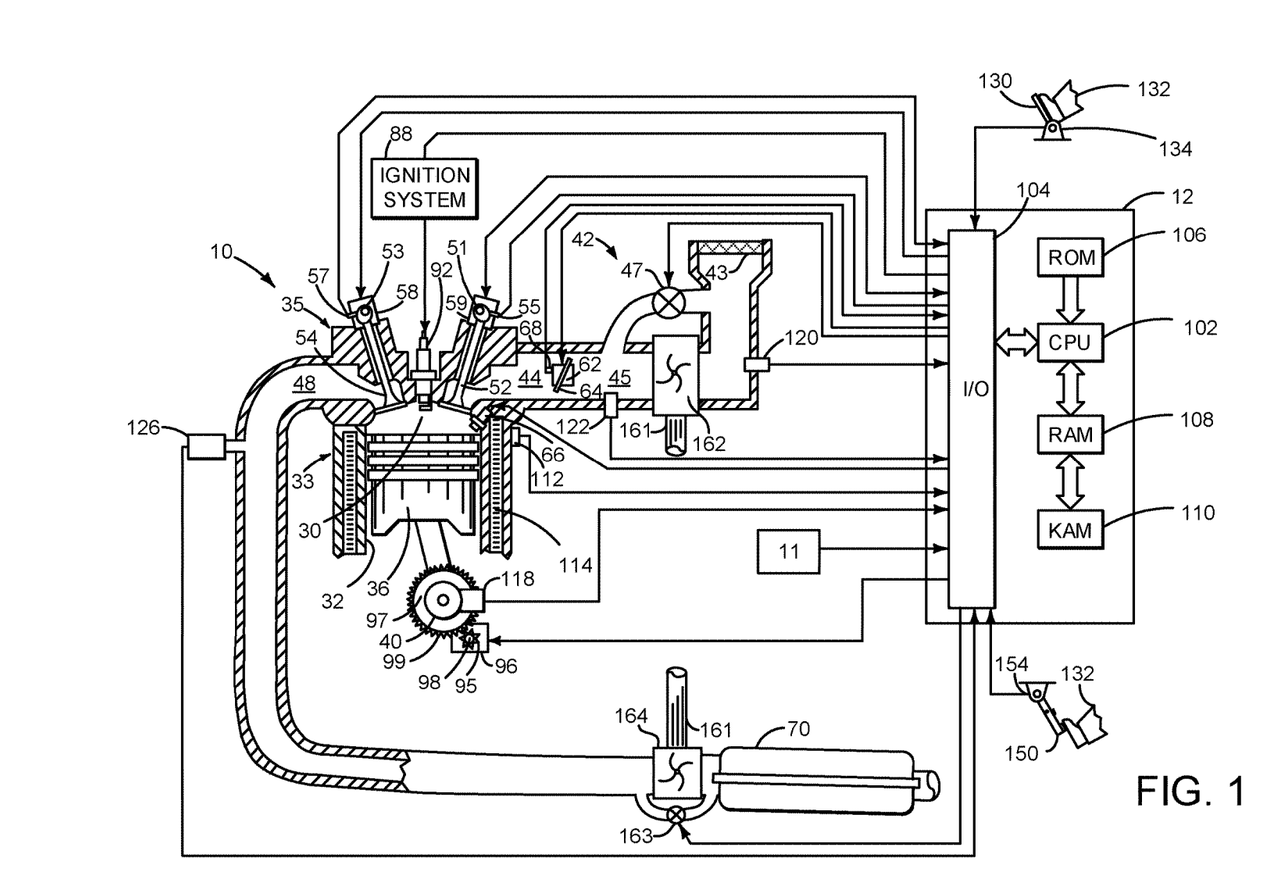
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIG. 1 and employs the actuators shown in FIG. 1 to adjust engine operation based on the received signals and instructions stored in non-transitory memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250, thereby providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

Engine 10 may be started with an engine starting system shown in FIG. 1. Further, torque of engine 10 may be adjusted via torque actuator 204, such as a fuel injector, throttle, etc. An engine output torque may be transmitted to torque converter 206 via crankshaft 40. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as crankshaft 40.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine. Vehicle system controller 255 requests the engine torque from engine controller. If the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device (e.g., battery) 263, controller 12 adjust current supplied to field winding 235 of alternator 219. Alternator 219 converts torque from engine 10 into electrical energy and it supplies the electrical energy to electric energy storage device 263. Electrical energy storage device 263 and alternator 219 may provide electrical power to electrical accessories 279, which may include but are not limited to front and rear windshield resistive heaters, vacuum pumps, climate control fans, and lights. Vehicle system controller 255 may request increased engine torque to overcome the charging torque to meet the driver demand torque.

In response to a request to decelerate vehicle 225, vehicle system controller 255 requests a friction braking torque by applying friction brakes 218. Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that wheels do not lock for an extended period of time.

Thus, the system of FIGS. 1 and 2 provides for a system, comprising: an engine; an alternator coupled to the engine; a clutch configured to selectively couple a shaft of the ISG to a shaft of the engine; and a controller including executable instructions stored in non-transitory memory to inhibit automatic engine stopping via the controller based on battery voltage determined during operating the engine in a deceleration fuel shut off mode. For example, the controller may inhibit engine stopping when a battery voltage changes by more than a threshold voltage amount. Controller 12 decides when to stop engine 10 for automatic engine stopping. The system includes where deceleration fuel shut off includes ceasing fuel delivery to the engine via the controller. The system further comprises additional instructions to operate the engine in deceleration fuel shut off mode in response to a driver demand torque. The system further comprises additional instructions to increase loads of vehicle electrical accessories via the controller in response to an indication that a battery has been replaced or boosted. The system further comprises additional instructions to decrease output of the alternator during the deceleration fuel shut off mode. The system further comprises additional instructions to increase output of the alternator after exiting the deceleration fuel shut off mode.

Referring now to FIG. 3, example plots of a vehicle operating sequence are shown. The operating sequence may be performed via the system of FIGS. 1 and 2 in cooperation with the method of FIG. 4. Vertical lines at times t0-t6 represent times of interest during the sequence. The plots in FIG. 3 are time aligned and occur at the same time. The double SS marks along each of the horizontal axes of the plots represent a break in time and a duration of the break in time may be long or short.

The first plot from the top of FIG. 3 is a plot of engine deceleration fuel shut off (DFSO) mode state. The vertical axis represents engine DFSO state and the engine is in DFSO mode when trace 302 is at a higher level near the vertical axis arrow. The engine is not in DFSO mode when trace 302 is at a lower level near the horizontal axis. In deceleration fuel shut off mode, the engine is rotated via the vehicle's kinetic energy which is transferred from the vehicle's wheels to the engine via the transmission and the torque converter. Fuel is not supplied to the engine when the engine is in DFSO mode. Spark may or may not be delivered to engine cylinders when the engine is in DFSO mode. The horizontal axis represents time and time increases from the left side of the figure to the right side of the figure. Solid line 302 represents engine DFSO state.

The second plot from the top of FIG. 3 is a plot of battery state of charge (SOC) versus time. The vertical axis represents battery SOC and SOC increases in the direction of the vertical axis arrow. The SOC is zero at the level of the horizontal axis. Solid line trace 304 represents battery SOC for a battery. The horizontal axis represents time and time increases from the left side of the figure to the right side of the figure.

The third plot from the top of FIG. 3 is a plot of an engine start request state versus time. The vertical axis represents engine start request state and the engine start request is asserted when trace 308 is at a higher level near the vertical axis arrow. The engine start request is not asserted when trace 308 is at a lower level near the horizontal axis. The engine start request is at a high level after the engine is started. The horizontal axis represents time and time increases from the left side of the figure to the right side of the figure. Trace 308 represents the engine start request state.

The fourth plot from the top of FIG. 3 is a plot of accessory electrical load versus time. The vertical axis represents accessory electrical load and accessory electrical load increases in the direction of the vertical axis arrow. The accessory electrical load is zero at the level of the horizontal axis. Solid line trace 310 represents accessory electrical load. Accessory electrical loads may include but are not limited to rear window resistive defrosters, climate control system fans, front windshield defrosters, vacuum pumps, and ignition coils. The horizontal axis represents time and time increases from the left side of the figure to the right side of the figure.

The fifth plot from the top of FIG. 3 is a plot of engine speed versus time. The vertical axis represents engine speed and engine speed increases in the direction of the vertical axis arrow. The engine speed is zero at the level of the horizontal axis. Solid line trace 312 represents engine speed. The horizontal axis represents time and time increases from the left side of the figure to the right side of the figure.

The sixth plot from the top of FIG. 3 is a plot of alternator electrical power output versus time. The vertical axis represents alternator electrical power output and alternator electrical power output increases in the direction of the vertical axis arrow. The electrical power output from the alternator is zero at the level of the horizontal axis. Solid line trace 314 represents alternator electrical power output. The horizontal axis represents time and time increases from the left side of the figure to the right side of the figure.

The seventh plot from the top of FIG. 3 is a plot of an engine automatic stop/start inhibit request state versus time. The vertical axis represents engine automatic stop/start inhibit request state and the engine automatic stop/start inhibit request is asserted when trace 316 is at a higher level near the vertical axis arrow. The engine automatic stop/start inhibit request state is not asserted when trace 316 is at a lower level near the horizontal axis. Trace 316 represents the engine automatic stop/start inhibit request. The horizontal axis represents time and time increases from the left side of the figure to the right side of the figure.

At time t0, the engine is stopped (e.g., not rotating and not combusting fuel) and battery SOC is at a higher level. An engine start is not requested and the electrical accessory load is low. Engine speed is zero and alternator electrical power output is zero. Automatic engine stopping and starting is inhibited and the engine is not in DFSO mode.

At time t1, the engine start request is asserted and engine speed begins to increase via a starter rotating the engine. Spark and fuel are supplied to the engine as the engine rotates (not shown). The engine is not in DFSO mode and battery SOC begins to decline as electrical power is used by the starter to rotate the engine. The electrical accessory load remains low and alternator electrical power output is low. Automatic engine stopping and starting is inhibited. The engine does not start between time t1 and time t2 so the engine start request is withdrawn. The engine speed is reduced in response to the absence of the engine start request. The engine is not in DFSO and battery SOC declines while the engine is rotated via the starter. The electrical accessory load also remains low and alternator electrical power output is low. Automatic engine stopping and starting is inhibited.

At time t2, the engine start request is asserted a second time and engine speed begins to increase via a starter rotating the engine in response the second engine start request. Spark and fuel are supplied to the engine as the engine rotates (not shown). The engine is not in DFSO mode and battery SOC begins to decline as electrical power is used by the starter to rotate the engine. The electrical accessory load remains low and alternator electrical power output is low. Automatic engine stopping and starting is inhibited. The engine does not start between time t2 and time t3 so the engine start request is withdrawn. The engine speed is reduced in response to the absence of the engine start request. The engine is not in DFSO and battery SOC declines while the engine is rotated via the starter. The electrical accessory load also remains low and alternator electrical power output is low. Automatic engine stopping and starting is inhibited. Thus, two attempts have been made to start the engine and the engine has not started for either start attempt.

At time t3, the engine start request is asserted a third time and engine speed begins to increase via a starter rotating the engine in response the third engine start request. Spark and fuel are supplied to the engine as the engine rotates (not shown). The engine is not in DFSO mode and battery SOC begins to decline as electrical power is used by the starter to rotate the engine. The electrical accessory load remains low and alternator electrical power output is low. Automatic engine stopping and starting is inhibited. The engine does not start between time t3 and the break in time between time t3 and time t4 so the engine start request is withdrawn. The engine speed is reduced in response to the absence of the engine start request. The engine is not in DFSO and battery SOC declines further while the engine is rotated via the starter. The electrical accessory load also remains low and alternator electrical power output is low. Automatic engine stopping and starting is inhibited. Thus, two attempts have been made to start the engine and the engine has not started for either start attempt.

Between time t3 and time t4, the vehicle battery is replaced with a new charged battery. Alternatively, a second battery may be coupled in parallel with the battery to assist starting of the engine.

At time t4, the engine is not in DFSO and battery SOC is at a higher level. An engine start is requested and the starter begins to crank the engine. Engine speed increases after time t4 and the electrical accessory load is low. The engine starts shortly after time t4 and its engine speed increases under the engine's own power. Electrical output power from the alternator increases shortly after time t4 and automatic engine stopping and starting is inhibited in response to the indication of battery replacement or boosting via a second battery. In one example, the plurality of starting attempts at times t1, t2, and t3, along with an actual engine start at time t4, is indicative that the battery has been replaced or boosted (e.g., a second battery is coupled in parallel with a first battery to boost an amount of charge that is available to rotate the engine via the starter) via a second battery.

Between time t4 and time t5, the engine is not in DFSO mode and the battery SOC increases in response to electrical power output of the alternator increasing. The engine remains running (combusting fuel and rotating) and the accessory load is at a lower level. Engine speed is increased to increase electrical output of the alternator and to accelerate the vehicle. Engine automatic stopping and starting is inhibited since battery boosting or battery replacement has occurred.

At time t5, the engine enters DFSO mode where the engine rotates via the vehicle's kinetic energy being transferred from the vehicle's wheels to the engine. The engine is not supplied with fuel. The engine may enter DFSO mode in response to driver demand torque being less than a threshold level and vehicle speed being greater than a threshold level. The accessory electrical load is increased while the engine is in DFSO mode so that battery performance may be determined by reducing battery SOC. The electrical output of the alternator is reduced to zero so that the battery SOC does not increase and interfere with diagnosing the battery for degradation. Automatic engine stopping and starting is inhibited so that the engine may not be automatically stopped in response to vehicle operating conditions. This way of operating the vehicle allows the alternator to continue to charge the battery even during low driver demand conditions so that the engine may be restarted via the starter and the battery if the driver stops the engine after the battery was replaced or boosted.

Between time t5 and time t6, the engine remains in DFSO mode and electrical accessory loads remain high to reduce the battery SOC. If battery SOC is reduced by more than a threshold amount while the accessory electrical load is increased, it may be determined that the battery is degraded since the drop in SOC indicates that the battery has a low capacity to store charge. If battery SOC is not reduced by more than the threshold amount while the accessory electrical load is increased, it may be determined that the battery is not degraded since the drop in SOC is low indicating that the battery has a higher capacity to store charge. In this example, the threshold drop in SOC is indicated by the length of arrow 306 and SOC drops by more than threshold 306 so the battery may be determined as degraded. Automatic engine stopping and starting remains inhibited since the battery is determined to be degraded so that the battery may have an opportunity to charge to a higher level. This may allow the engine to be started if the vehicle's human driver stops the engine. If the battery SOC was reduced by an amount that is less than the threshold amount, then automatic engine stopping and starting would have been allowed.

At time t6, the engine exits DFSO mode and the electrical accessory load is decreased in response to the engine exiting DFSO. Further, electrical output of the alternator is increased in response to the engine exiting DFSO. Automatic engine stopping and starting remains inhibited and battery SOC begins to increase so that when the engine is eventually stopped, it may be restarted via the battery. The engine is supplied with fuel and spark after exiting DFSO and the engine rotates under its own power. Engine speed is shown increasing in response to driver demand torque (not shown).

In this way, automatic engine stopping and starting may be inhibited or prevented in response to a degraded battery. The battery level of degradation may be assessed while an engine is in DFSO mode so that the engine may not misfire due to low battery SOC while diagnosing the battery. By operating the engine in a way that the engine does not misfire, engine emissions may be reduced.

Referring now to FIG. 4, a flow chart of a method for operating a hybrid vehicle driveline is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world.

At 402, method 400 determines operation conditions. Operating conditions may include but are not limited to engine speed, battery SOC, engine load, driver demand torque, battery voltage, and engine operating state. Method 400 proceeds to 404.

At 404, method 400 judges if a plurality of engine starts have been requested and/or attempted without the engine actually starting (e.g., combusting fuel and rotating under its own power). In one example, method 400 tracks and records an actual total number of engine starting attempts where the engine fails to start between each consecutive engine start attempt. An engine start attempt may comprise rotating the engine via an electric machine, such as a starter, and supplying fuel to the engine's cylinders. In some examples, an engine start attempt also includes supplying spark to the engine's cylinders. If the engine begins to combust fuel and accelerate under its own power to a predetermined speed (e.g., engine idle speed), then the engine start attempt may be characterized as successful. If the engine does not accelerate under its own power to a predetermined speed (e.g., engine idle speed) after being cranked (e.g., rotated via the electric machine at a threshold speed (e.g., 250 RPM), then the engine start attempt may be characterized as unsuccessful and the engine has not started. If the engine starting attempt is unsuccessful and the engine does not accelerate to the predetermined speed in a predetermined amount of time, engine rotational speed may be reduced to zero before attempting another engine start. Method 400 counts the actual total number of consecutive engine start attempts where the engine fails to start. If method 400 judges that the actual total number of consecutive engine starting attempts performed without the engine starting exceeds a threshold number, then the answer is yes and method 400 proceeds to 406. Otherwise, the answer is no and method 400 proceeds to 450.

At 450, method 400 judges if a check or diagnostic for an electric energy storage device or battery is desired. In one example, a diagnostic for the electric energy storage device may be desired and performed at a predetermined interval (e.g., every 100 hours). Further, a diagnostic may be desired and performed responsive to electric energy storage device conditions (e.g., state of charge, output voltage, temperature, etc.). If method 400 judges that an electric energy storage device diagnostic is requested or desired, then the answer is yes and method 400 proceeds to 406. Otherwise, the answer is no and method 400 proceeds to 452.

At 452, method 400 charges the electric energy storage device. In one example, method 400 adjusts an amount of current supplied to a field of an alternator so that the electric energy storage device may be charged to a predetermined state of charge. The battery state of charge may be estimated based on battery voltage and coulomb counting. The amount of charge that is supplied to the electric energy storage device may be reduced once battery voltage reaches a threshold voltage. Method 400 proceeds to 454.

At 454, method 400 permits automatic engine stopping and starting. In one example, the engine may be automatically stopped (e.g., engine rotation stops and fuel is not supplied to the engine) when driver demand torque is less than a threshold torque and when vehicle speed is less than a threshold vehicle speed. Further, in some examples, the engine may be automatically stopped when a battery SOC is greater than a threshold. The engine may be automatically stopped without a human driver providing input to a device or input that has a sole purpose of requesting engine stopping and starting. However, if battery degradation is determined at 412, then automatic engine stopping and starting may be inhibited or prohibited. Thus, even if conditions that would normally cause the engine to stop automatically are present, the engine will continue to run so that the electric energy storage device may charge until the human driver specifically requests the engine to stop. If the human driver provides input to the device or input that has the sole function of requesting an engine stop or start (e.g., a starter switch or pushbutton), then the engine may be stopped according to the driver's request that is input to the device. Method 400 proceeds to exit.

At 406, method 400 judges if conditions are present for operating the engine in DFSO mode. In one example, the engine may enter DFSO mode when driver demand torque is less than a threshold torque. Driver demand torque may be determined from accelerator pedal position and vehicle speed. In one example, a table or function of empirically determined driver demand torque values are referenced or indexed via accelerator pedal position and vehicle speed. The table then outputs a driver demand torque. The driver demand torque values may be empirically determined via operating a vehicle including applying the accelerator pedal and adjusting values in the table until a desired level of vehicle acceleration is provided. If method 400 judges that conditions are present to enter DFSO, then the answer is yes and method 400 proceeds to 406. Otherwise, the answer is no and method 400 proceeds to 460.

At 460, method 400 charges the electric energy storage device. In one example, method 400 adjusts an amount of current supplied to a field of an alternator so that the electric energy storage device may be charged to a predetermined state of charge. The battery state of charge may be estimated based on battery voltage and coulomb counting. The amount of charge that is supplied to the electric energy storage device may be reduced once battery voltage reaches a threshold voltage. Method 400 proceeds to exit.

At 408, method 400 ceases to supply spark and fuel to the engine. Fuel flow may be ceased via closing the engine's fuel injectors. Further, the engine is rotated via applying the vehicle's kinetic energy to the engine from the vehicle's wheels via the vehicle's transmission. For example, while the vehicle is traveling on a road at a speed of 50 KPH, the kinetic energy of the moving vehicle is transferred to the vehicle's wheels to rotate the engine via the transmission. In addition, method 400 may fully close the torque converter lockup clutch to increase the efficiency of torque transfer from the vehicle's wheels to the engine. Thus, during DFSO, the engine is rotated at a speed that is proportionate to vehicle speed while combustion in the engine is inhibited by ceasing fuel flow to the engine. In addition, method 400 reduces electrical output of vehicle's alternator to zero. By reducing output of the alternator to zero, the electric energy storage device may be exercised to diagnose the electric energy storage device. Output of the alternator may be reduced to zero by reducing current flow to the field winding of the alternator to zero. Method 400 proceeds to 410.

At 410, method 400 increases accessory electrical loads that are applied to the electric energy storage device. Accessory electrical loads may include but are not limited to resistive rear and front windshield defrosters, lights, climate control system fans, and vacuum pumps. One or more of the accessory electrical loads may be activated and supplied with electrical power from the electric energy storage device so that the electric energy storage device may be exercised for the purpose of evaluating the electric energy storage device for possible degradation. In one example, accessory electrical loads are activated to provide a predetermined electrical energy consumption rate during DFSO. For example, resistive windshield defrosters may be activated to consume 240 watts of electrical energy from the electric energy storage device. The accessory electrical loads may be shut off or deactivated so as to cease drawing current from the electric energy storage device after a predetermined amount of power has been consumed from the electric energy storage device. Alternatively, the accessory electrical loads may be shut off or deactivated after a predetermined amount of time since their most recent activation. Method 400 proceeds to 412 after increasing the accessory electrical loads.

At 412, method 400 judges if a predetermined amount of time has expired since the engine most recently entered DFSO mode, or if a voltage of an electric energy storage device is less than a threshold voltage, or if a voltage of the electric energy storage device has been reduced by more than a threshold voltage amount since the engine most recently entered DFSO mode, or if the engine has exited DFSO mode based on driver demand torque has occurred, then the answer is yes and method 400 proceeds to 414. Otherwise, the answer is no and method 400 returns to 410.

At 414, method 400 reduces the load of electrical accessories and exits DFSO. Method 400 may reduce the load of electrical accessories to their base levels (e.g., their respective levels immediately before the engine entered DFSO mode) or to zero. Further, method 400 may increase output of the alternator by increasing current flow to the alternator's field windings. Thus, method 400 may increase an amount of charge supplied to the electric energy storage device so that the engine may be started if the vehicle's human driver stops the engine manually. Method 400 proceeds to 416.

At 416, method 400 judges if a voltage of the battery has been reduced by more than a threshold voltage between the time the engine entered DFSO (step 406) and the time the engine exited DFSO (step 412) during a sole DFSO event (e.g., a DFSO event may begin when fuel flow to the engine is ceased while the engine is rotating and the DFSO event may end when fuel flow is supplied to the engine after the engine most recently entered DFSO). A voltage drop that is greater than the threshold voltage drop may be indicative of a degraded battery since a degraded battery may have a more limited capacity to store charge. Alternatively, method 400 may judge if a SOC of the battery has been reduced by more than a threshold SOC between the time the engine entered DFSO (step 406) and the time the engine exited DFSO (step 412) during a sole DFSO event. A SOC drop that is greater than the threshold SOC drop may be indicative of a degraded battery since a degraded battery may have a more limited capacity to store charge. If method 400 judges that a voltage or SOC of the battery has been reduced by more than a threshold voltage or SOC between the time the engine entered DFSO and the time the engine exited DFSO during a sole DFSO event, then the answer is yes and method 400 proceeds to 418. Otherwise, the answer is no and method 400 proceeds to 454. Method 400 may also provide an indication of electric energy storage device degradation if the answer is yes. Method 400 may change a value of a variable stored in controller memory and provide a visual or audible indication to vehicle occupants of electric energy storage device degradation via a human/machine interface.

At 418, method 400 inhibits or prevents the engine from automatically stopping. By preventing the engine from automatically stopping, method 400 may help to ensure that the engine may be restarted after the vehicle's human driver stops the engine since the electric energy storage device may have more time t0 charge. Further, by preventing the engine from automatically stopping, it may be possible for the vehicle to reach its final destination so that the battery does not have to be boosted multiple times to reach the final destination. In one example, method 400 does not allow automatic engine stopping when a value of a variable is not a predetermined value (e.g., one). Method 400 proceeds to exit.

In this way, automatic engine stopping and starting may be allowed or prevented in response to diagnosing an electric energy storage device while an engine is in a DFSO mode so that the engine may not misfire and degrade engine emissions. Further, by diagnosing the electric energy storage device during DFSO conditions, it may be possible to diagnose the electric energy storage device in a way that allows the engine to be restarted if the vehicle's human driver manually stops the engine at a later time.

Thus, the method of FIG. 4 provides for a powertrain operating method, comprising determining that a battery of a vehicle has been replaced or has been boosted; increasing loads of vehicle electrical accessories via a controller during deceleration fuel shut off in response to the indication that the battery has been replaced or boosted; determining that a voltage of a battery has decreased more than a threshold amount; and inhibiting automatic engine stopping via the controller in response to the voltage of the battery decreasing more than the threshold amount. The method includes where the voltage of the battery has decreased more than the threshold amount while loads of the vehicle electrical accessories increased during deceleration fuel shut off. The method includes where determining that the battery of the vehicle has been replaced or boosted includes determining that an engine has been cranked without starting a plurality of times. The method includes where determining that the battery of the vehicle has been replaced or boosted includes determining that an engine has been cranked without starting a plurality of times and that the engine started after not starting the plurality of times. The method includes where deceleration fuel shut off includes rotating an engine via a vehicle's kinetic energy. The method includes where deceleration fuel shut off includes ceasing to supply fuel to cylinders of the engine. The method further comprises exiting deceleration fuel shut off in response to a voltage of a battery being less than a threshold voltage. The method includes where automatic engine stopping includes stopping the engine without a vehicle's driver providing input to a device that has a sole function of requesting engine stopping and starting.

The method of FIG. 4 also provides for a powertrain operating method, comprising: determining a request to assess a battery for degradation; increasing loads of vehicle electrical accessories and decreasing output of an alternator during deceleration fuel shut off of an engine via a controller in response to a request to assess the battery for degradation;

determining that a voltage of a battery has decreased more than a threshold amount; and inhibiting automatic engine stopping via the controller in response to the voltage of the battery decreasing more than the threshold amount. The method includes where the voltage of the battery has decreased more than the threshold amount while loads of the vehicle electrical accessories increased during deceleration fuel shut off. The method further comprises decreasing loads of vehicle electrical accessories after exiting deceleration fuel shut off. The method includes where inhibiting automatic engine stopping prevents engine stopping in response to driver demand torque being less than a threshold value. The method further comprises charging the battery while not in deceleration fuel shut off. The method includes where the accessory loads include a resistive window defroster.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
   increasing loads of vehicle electrical accessories via a controller during deceleration fuel shut off in response to an indication that the battery has been replaced or boosted; and
   inhibiting automatic engine stopping via the controller in response to the voltage of the battery decreasing more than the threshold amount.

2. The method of claim 1, where the voltage of the battery has decreased more than the threshold amount while loads of the vehicle electrical accessories increased during deceleration fuel shut off.

3. The method of claim 1, where determining that the battery of the vehicle has been replaced or boosted includes determining that an engine has been cranked without starting a plurality of times.

4. The method of claim 1, where determining that the battery of the vehicle has been replaced or boosted includes determining that an engine has been cranked without starting a plurality of times and that the engine started after not starting the plurality of times.

5. The method of claim 1, where deceleration fuel shut off includes rotating an engine via a vehicle's kinetic energy.

6. The method of claim 1, where deceleration fuel shut off includes ceasing to supply fuel to cylinders of the engine.

7. The method of claim 1, further comprising exiting deceleration fuel shut off in response to a voltage of a battery being less than a threshold voltage.

8. The method of claim 1, where automatic engine stopping includes stopping the engine without a vehicle's driver providing input to a device that has a sole function of requesting engine stopping and starting.

9. A powertrain operating method, comprising:
   increasing loads of vehicle electrical accessories and decreasing output of an alternator during deceleration fuel shut off of an engine via a controller in response to a request to assess the battery for degradation; and
   inhibiting automatic engine stopping via the controller in response to the voltage of the battery decreasing more than the threshold amount.

10. The method of claim 9, where the voltage of the battery has decreased more than the threshold amount while loads of the vehicle electrical accessories increased during deceleration fuel shut off.

11. The method of claim 9, further comprising decreasing loads of vehicle electrical accessories after exiting deceleration fuel shut off.

12. The method of claim 9, where inhibiting automatic engine stopping prevents engine stopping in response to driver demand torque being less than a threshold value.

13. The method of claim 9, further comprising charging the battery while not in deceleration fuel shut off.

14. The method of claim 9, where the accessory loads include a resistive window defroster.

15. A system, comprising:
    an engine;
    an alternator coupled to the engine;
    a clutch configured to selectively couple a shaft of the ISG to a shaft of the engine; and
    a controller including executable instructions stored in non-transitory memory to inhibit automatic engine stopping via the controller based on battery voltage determined during operating the engine in a deceleration fuel shut off mode.

16. The system of claim 15, where deceleration fuel shut off includes ceasing fuel delivery to the engine via the controller.

17. The system of claim 15, further comprising additional instructions to operate the engine in deceleration fuel shut off mode in response to a driver demand torque.

18. The system of claim 15, further comprising additional instructions to increase loads of vehicle electrical accessories via the controller in response to an indication that a battery has been replaced or boosted.

19. The system of claim 15, further comprising additional instructions to decrease output of the alternator during the deceleration fuel shut off mode.

20. The system of claim 15, further comprising additional instructions to increase output of the alternator after exiting the deceleration fuel shut off mode.

* * * * *